United States Patent [19]

Kaplan et al.

[11] Patent Number: 5,057,052

[45] Date of Patent: * Oct. 15, 1991

[54] PEDESTAL TOY

[75] Inventors: Andrew J. Kaplan, Portsmouth, N.H.; Edward B. Seldin, Cambridge, Mass.

[73] Assignee: Kinderworks Corporation, Portsmouth, N.H.

[ * ] Notice: The portion of the term of this patent subsequent to Aug. 21, 2007 has been disclaimed.

[21] Appl. No.: 581,891

[22] Filed: Sep. 13, 1990

[51] Int. Cl.$^5$ .................................................. A63H 33/00
[52] U.S. Cl. ..................................................... 446/236
[58] Field of Search ............... 446/236, 238, 246, 265, 446/237, 242, 266; 74/69

[56] References Cited

U.S. PATENT DOCUMENTS

| 1,522,472 | 1/1925 | Sundell | 446/265 X |
| 2,485,893 | 10/1949 | Kost | 74/69 X |
| 4,224,757 | 9/1980 | Kelley | 446/246 |
| 4,950,199 | 8/1990 | Kaplan et al. | 446/238 |

Primary Examiner—Mickey Yu
Attorney, Agent, or Firm—Reed Smith Shaw & McClay

[57] ABSTRACT

The present invention relates to a novel pedestal toy that includes a base-supported axle which includes at least two substantially circular rotatable members rotatably fitted thereon. The substantially circular rotatable members are rotatably engaged with each other such that when the pedestal toy is operated, one substantially circular rotatable member rotates, thereby rotating the other substantially circular rotatable member.

10 Claims, 2 Drawing Sheets

PEDESTAL TOY

FIELD OF THE INVENTION

The present invention relates to an apparatus, specifically a pedestal toy for children.

SUMMARY OF THE INVENTION

The pedestal toy of the present invention includes a base having connected thereto an axle which includes at least two substantially circular members rotatably fitted thereon. The substantially circular members are rotatably engaged with each other such that when the pedestal toy is operated, one substantially circular member engages the other substantially circular member, thereby rotating the other member.

Other details, objects and advantages of the invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings, wherein.

DETAILED DESCRIPTION OF THE INVENTION

Figure 1:
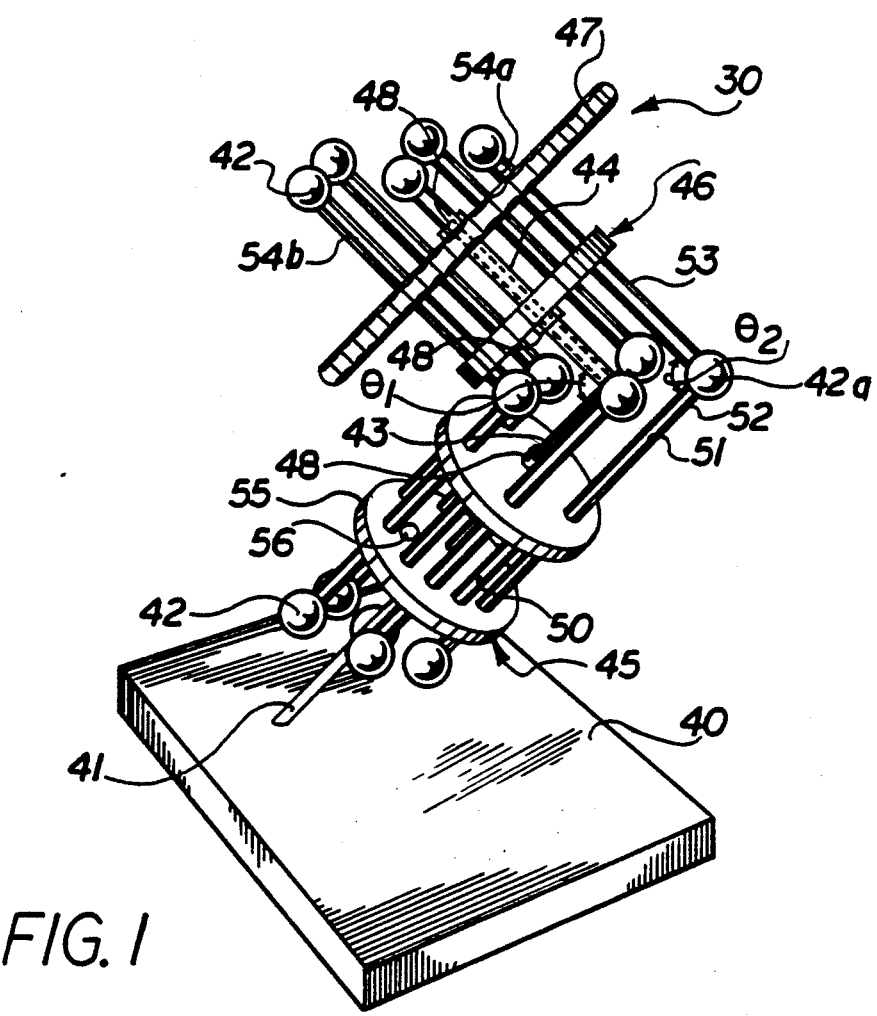
FIG. 1 represents an elevation view of a preferred embodiment of the present invention.
Figure 2:
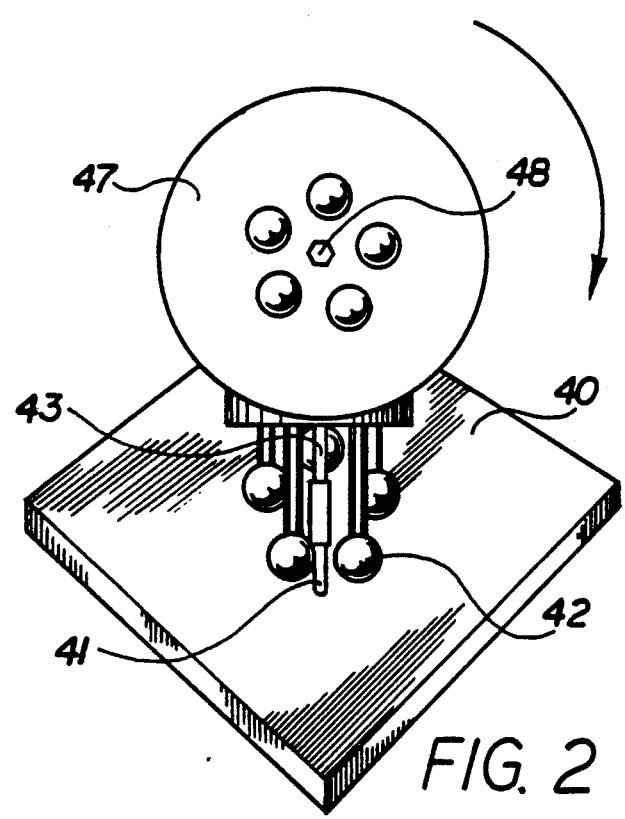
FIG. 2 represents a top elevation view of the preferred embodiment of the invention illustrated in FIG. 1.

The preferred embodiment of the invention is shown in FIGS. 1 and 2. In this embodiment, the invention comprises a pedestal toy 30 having a base 40 having rigidly connected thereto an angular axle member 41. The angular axle member 41 may be connected at any angle to the base provided sufficient clearance is provided for end pieces 42 to rotate freely.

As illustrated, the angular axle member 41 has a first arm 43 which is connected rigidly to the base 40, such as by embedding the arm 43 within the base 40 or by other well-known means. The axle member 41 further includes a second arm 44 disposed at an angle $\theta_1$ with respect to the first arm 43 and being connected thereto.

As illustrated in FIG. 1, the first arm 43 of the angular axle member 41 preferably has a first substantially circular member 45 rotatably fitted thereon. The first substantially circular member 45 is fitted on the first arm 43 such that the first substantially circular member 45 may freely rotate about the first arm 43 in either a clockwise or counterclockwise direction.

As further illustrated in FIG. 1, the angular axle member 41 further preferably includes a second substantially circular member 46 rotatably fitted on the second arm 44. Second substantially circular member 46 is likewise fitted to enable free rotation of the second substantially circular member 46 about the second arm 44 in either a clockwise or counterclockwise direction.

Both the first arm 43 and second arm 44 preferably include a pair of stops 48 which substantially prevent the first and second substantially circular members 45 and 46 from sliding along the first and second arms 43 and 44, respectively, in an axial direction.

As illustrated in FIGS. 1 and 2, the first and second substantially circular members 45 and 46 are rotatably connected to each other by at least one substantially circular member engaging means 51. The substantially circular member engaging means 51 preferably comprises a first shaft 52 and a second shaft 53 connected to each other at an angle $\theta_2$ substantially corresponding to the angle $\theta_1$ of the angular axle member 41. The substantially circular member engaging means 51 allows the second substantially circular member 46 to drive the first substantially circular member 45.

The pedestal toy preferably includes a gripping means 47, which may be integrally formed with one of the rotatable members 45 or 46. The purpose of the gripping means 47 as illustrated in FIG. 1 is to permit anyone using the pedestal toy to grip the gripping means 47, which, when turned clockwise as depicted in FIG. 2, turns the substantially circular rotatable member 46 to rotate in the same direction, which causes the substantial circular rotatable member 45 to rotate as previously described. If the gripping means 47 is rotated in the opposite direction from that shown in FIG. 2, the rotational directions of the first and second substantially circular members 45 and 46 are reversed.

As illustrated in FIGS. 1 and 2, the first shaft 52 of the substantially circular member engaging means 51 passes slidably through the first substantially circular member 45 in a direction substantially parallel to the first arm 43 of the angular axle member 41. Likewise, the second shaft 53 of the substantially circular member engaging means 51 passes slidably through the second substantially circular member 46 in a direction substantially parallel to the second arm 44 of the angular axle member 41.

As illustrated in Figure the substantially circular members 45 and 46 preferably comprise a pair of round disks 55 connected to and separated from each other by a plurality of spacer means 50. In a more preferred embodiment, the upper disk of substantially circular member 46 is of a larger diameter than the lower disk to make it easier for a child to turn second substantially circular member 46. Although round disks are preferred, oblong, elliptical, hexagonal, octagonal and other substantially circular-shaped disks may be used. The spacer means are preferably a series of cylindrical dowels which pass through each of the disks 55 and are secured thereto.

In a most preferred embodiment of the invention, the pedestal toy 30 includes a plurality of substantially circular member engaging means 51, as illustrated in FIGS. 1 and 2. When a plurality of substantially circular member engaging means 51 are used, it is most preferable that the substantially circular member engaging means be arranged circumferentially around the substantially circular member through which they pass. Most preferably the substantially circular member engaging means are equally spaced around the substantially circular member as illustrated in FIGS. 1 and 2. The circumferential spacing of the first shaft 52 of the substantially circular member engaging means 51 around the first substantially circular member 45 preferably corresponds to the circumferential spacing of the second shaft 53 of the substantially circular member engaging means around the second substantially circular member 46 in order that the second substantially circular member 46 may properly drive the first substantially circular member 45 as described above.

As illustrated in FIGS. 1 and 2, each substantially circular member engaging means 51 preferably includes an end piece 42 at the end of the first shaft 52 distal from the second shaft 53, and an end piece 42 at the end of the second shaft 53 distal from the first shaft 52. These end pieces 42 may be brightly colored to further facilitate user interest. Additionally, the first and second shafts 52 and 53 of the substantially circular member engaging means 51 maybe connected by a third end piece 42a as illustrated in FIG. 1. Preferably, this connection through third end piece 42a produces a stable and substantially rigid joint between the first and second shafts 52 and 53. The end pieces 42 and 42a may be any geometrical shape, although a spherical geometry is preferred. As illustrated in FIGS. 1 and 2, the shafts 52 and 53 of the substantially circular member engaging means preferably do not pass completely through the end pieces 42 and 42a and are fastened in the interior of end pieces 42 and 42a.

In use, the gripping means 47 is grasped and rotated in either direction. This rotation in turn causes the substantially circular member engaging means 51 to experience a bi-directional rotation. This bi-directional rotation is best seen with reference to FIG. 1 and the substantially circular member engaging means 54a and 54b. As the second substantially circular member 46 rotates, the substantially circular member engaging means 51 and particularly the second shaft 53 thereof rotates from a position at the top of the second substantially circular member 46 as represented by substantially circular member engaging means 54a to a position at the bottom of the second substantially circular member 46 as represented by substantially circular member engaging means 54b. This rotation of the second shaft 53 of the substantially circular member engaging means 51 in turn causes a rotation of the first shaft 52 of the substantially circular member engaging means 51, which in turn forces the first substantially circular member 45 to rotate with respect to the base 40. As illustrated, the substantially circular members 45 and 46 and substantially circular member engaging means 51 are sized so as to permit the first shaft 52 of the substantially circular member engaging means 51 to clear the base 40.

In a preferred embodiment of the invention, the substantially circular members may include a rattle means 56 for producing a rattling sound when the substantially circular members rotate. This rattling means 56 may be any solid object sufficient to product the desired sound, such as a spherical marble or other spherical element. As illustrated, the two round disks 55 as connected by the spacer means 50 and the substantially circular member engaging means 51 house the rattle means 56. The rattle means 56 is sized to be contained by the spacer means 50 and the substantially circular member engaging means 51.

The present invention may be constructed of any desirable material. Preferably, the base, substantially circular members, substantially circular member engaging means and end pieces are fabricated of a hard wood, and the angular axle member and substantially circular member stops are fabricated of plastic, copper or steel tubing.

Although the invention has been described in detail for the purpose of illustration, it is to be understood that such detail is solely for that purpose and that variations can be made therein by those skilled in the art without departing from the spirit and scope of the invention except as it may be limited by the claims.

WHAT IS CLAIMED IS:

1. A pedestal toy including a base having an angular axle member secured thereto, said angular axle member including a first arm rigidly connected to said base, said axle member further including a second arm disposed at an angle with respect to said first arm and being connected thereto, said first arm having a first substantially circular rotatable member rotatably fitted thereon such that said first substantially circular rotatable member may rotate about said first arm, said second arm having a second substantially circular rotatable member rotatably fitted thereon such that said second substantially circular rotatable member may rotate about said second arm, said first and second substantially circular rotatable members being rotatably engaged with each other by at least one substantially circular rotatable member engaging means, said substantially circular rotatable member engaging means having a first shaft and a second shaft, said first and second shafts being connected to each other at an angle substantially corresponding to the angle of said angular axle member, said substantially circular rotatable member engaging means first shaft passing slidably through said first substantially circular rotatable member in a direction substantially parallel to said first arm of said angular axle member, said substantially circular rotatable member engaging means second shaft passing slidably through said second substantially circular rotatable member in a direction substantially parallel to said second arm of said angular axle member.

2. The pedestal toy of claim 1 wherein said angle at which said second arm of said angular axle member is disposed with respect to said first arm of said angular axle member is about 90°.

3. The pedestal toy of claim 1 wherein said second substantially circular rotatable member includes a gripping means enabling said second substantially circular rotatable member to be rotated about said second arm.

4. The pedestal toy of claim 1 wherein said first and second arms each include a pair of stops, said stops substantially preventing said first and- second substantially circular rotatable members from sliding along said first and second arms, respectively, in an axial direction.

5. The pedestal toy of claim 1 wherein said first and second substantially circular rotatable members each comprise two substantially round discs connected to and separated from each other by a plurality of spacer means.

6. The pedestal toy of claim 1 including a plurality of said substantially circular rotatable member engaging means, the first shaft of each said substantially circular rotatable member engaging means being spaced circumferentially about said first substantially circular rotatable member, the second shaft of each substantially circular rotatable member engaging means being spaced circumferentially about said second substantially circular rotatable member.

7. The pedestal toy of claim 6 wherein each said first shaft of said substantially circular rotatable member engaging means is spaced circumferentially equidistant about said first substantially circular rotatable member and each said second shaft of said substantially circular rotatable member engaging means is spaced circumferentially equidistant about said second substantially circular rotatable member.

8. The pedestal toy of claim 1 wherein said substantially circular rotatable member engaging means first shaft includes an end piece at the end of said first shaft distal from said second shaft, and said substantially circular rotatable member engaging means second shaft includes an end piece at the end of said second shaft distal from said first shaft.

9. The pedestal toy of claim 5 wherein said spacer means and said two substantially round discs of said first and second substantially circular rotatable members house a rattle means for producing a rattling sound when said substantially circular rotatable members rotate.

10. The pedestal toy of claim 9 wherein said rattle means comprises a spherical element sized to be contained by said spacer means and said substantially round discs of said substantially circular rotatable members.

* * * * *